(12) United States Patent
Kailasam et al.

(10) Patent No.: US 8,034,857 B2
(45) Date of Patent: Oct. 11, 2011

(54) POLYETHERIMIDE/POLYPHENYLENE ETHER SULFONE BLENDS

(75) Inventors: Ganesh Kailasam, Evansville, IN (US); Robert R Gallucci, Mt. Vernon, IN (US); Mark Alan Sanner, Newburgh, IN (US)

(73) Assignee: Sabic Innovative Plastics IP B.V. (NL)

(*) Notice: Subject to any disclaimer, the term of this patent is extended or adjusted under 35 U.S.C. 154(b) by 530 days.

(21) Appl. No.: 11/853,357

(22) Filed: Sep. 11, 2007

(65) Prior Publication Data

US 2009/0018265 A1    Jan. 15, 2009

Related U.S. Application Data

(63) Continuation-in-part of application No. 11/776,658, filed on Jul. 12, 2007, now abandoned.

(51) Int. Cl.
*C08L 81/06* (2006.01)
*C08L 79/08* (2006.01)
*C08J 5/18* (2006.01)

(52) U.S. Cl. ........ 524/115; 525/132; 525/133; 525/149; 525/150; 525/390; 525/391; 525/392; 525/393; 525/397; 525/420; 525/426; 525/436

(58) Field of Classification Search .......... 524/115; 525/132, 133, 149, 150, 390, 391, 392, 393, 525/397, 420, 426, 436
See application file for complete search history.

(56) References Cited

U.S. PATENT DOCUMENTS

| | | | |
|---|---|---|---|
| 3,803,085 A | 4/1974 | Takehoshi et al. | |
| 3,847,867 A | 11/1974 | Heath et al. | |
| 3,852,242 A | 12/1974 | White | |
| 3,905,942 A | 9/1975 | Takekoshi et al. | |
| 3,972,902 A | 8/1976 | Heath et al. | |
| 3,983,093 A | 9/1976 | Williams, III et al. | |
| 4,176,222 A | 11/1979 | Cinderey et al. | |
| 4,293,670 A | 10/1981 | Robeson et al. | |
| 4,443,591 A | 4/1984 | Schmidt et al. | |
| 4,455,410 A | 6/1984 | Giles, Jr. | |
| 4,473,684 A | 9/1984 | Maresca et al. | |
| 4,503,168 A | 3/1985 | Hartsing, Jr. | |
| 5,037,902 A | 8/1991 | Harris et al. | |
| 5,134,202 A | 7/1992 | Harris et al. | |
| 5,191,305 A | 3/1993 | Frost et al. | |
| 5,212,259 A | 5/1993 | Harris et al. | |
| 5,286,812 A * | 2/1994 | Karasz et al. | 525/436 |
| 5,917,137 A | 6/1999 | Ekiner et al. | |
| 6,482,880 B1 | 11/2002 | Rock | |
| 7,041,773 B2 | 5/2006 | Gallucci et al. | |
| 2005/0113558 A1 | 5/2005 | Johnson et al. | |
| 2006/0069236 A1 | 3/2006 | Brunelle et al. | |
| 2006/0167216 A1 | 7/2006 | Johnson et al. | |

FOREIGN PATENT DOCUMENTS

EP    0440433    8/1991

OTHER PUBLICATIONS

ASTM D542, Standard Test Method for Index of Refraction of Transparent Organic Plastics, 4 pages.
ASTM D638, Standard Test Method for Tensile Properties of Plastics, 15 pages.
ASTM D648, Standard Test Method for Deflection Temperature of Plastics Under Flexural Load in the Edgewise Position, 13 pages.
ASTM D1003, Standard Test Method for Haze and Luminous Transmittance of Transparent Plastics, 6 pages.
ASTM D1238, Standard Test Method for Melt Flow Rates of Thermoplastics by Extrusion Plastometer, 14 pages.
ASTM D3763, Standard Test Method for High Speed Puncture Properties of Plastics Using Load and Displacement Sensors, 9 pages.
International Search Report for International Application No. PCT/US2008/069404, mailed Nov. 6, 2008, 5 pages.
Written Opinion for International Search Report for International Application No. PCT/US2008/069404, mailed Nov. 6, 2008, 5 pages.

* cited by examiner

*Primary Examiner* — Ana Woodward
(74) *Attorney, Agent, or Firm* — Cantor Colburn LLP; Diderico van Eyl

(57) ABSTRACT

Compositions comprise phase separated polyetherimide/polyphenylene ether sulfone blends. The dispersed phase has an average cross sectional size of 0.1 to 10 micrometers. The composition retains has good hydrolytic stability and is capable of withstanding steam autoclaving at temperatures of 130 to 138° C.

71 Claims, 2 Drawing Sheets

0.5 μm 0.5 μm 0.5 μm 0.5 μm

POLYETHERIMIDE/POLYPHENYLENE ETHER SULFONE BLENDS

CROSS REFERENCE TO RELATED APPLICATIONS

This application is a continuation-in-part application of U.S. patent application Ser. No. 11/776,658, filed Jul. 12, 2007 now abandoned, which is herein incorporated by reference in its entirety.

BACKGROUND

Disclosed herein are blends of polyetherimide and polyphenylene ether sulfone, methods for making the blends, and articles derived from such blends. The blends have a particularly advantageous combination of properties.

Blends of two or more polymers can have a single phase (miscible blends) or multiple phases (immiscible or phase separated blends). Phase separated blends are complex and unpredictable. These blends can demonstrate a host of behaviors from delamination to excellent impact strength, from opacity to transparency. The complexity and unpredictability of phase separated, multiphase polymer systems is such that small changes in composition or processing can have a dramatic effect on one or more physical properties. Overall, this makes it very difficult to achieve a desired combination of properties as modifications to the polymer system to address one physical property can cause significant changes in another property.

This is particularly true with regard to engineering thermoplastics, especially those with high glass transition temperatures such as polyetherimides. While polyetherimides have many valuable characteristics there is an increasing need for polymers or polymer blends with a combination of hydrolytic stability, high multiaxial impact energy, a high heat distortion temperature and a high modulus.

Concern about the spread of diseases, e.g., bovine spongiform encephalopathy, Creutzfeldt-Jakob disease and prions, has created heightened interest in high temperature sterilization. In the past, sterilization by use of devices such as an autoclave at 105° C. might have been acceptable. However, under new concerns, sterilization temperatures have been raised, in many instances to temperatures that can be as high as 130 to 138° C., or higher. These higher autoclaving and sterilization temperatures have placed added demands on plastic devices used in medical as well as food service and food preparation applications. Since many chemical reaction rates double for every 10° C. increase in temperature, the higher sterilization temperatures may cause chemical degradation, and ultimately, the breakage of plastic articles. Other plastics simply melt at the higher autoclave temperature. Thus, there is a need for plastic resins that will survive high temperature sterilization and autoclaving. In some applications, for example, in articles that will be used several times, retention of properties on exposure to repeated high temperature sterilization, as many as 100, 500 and even 1000 cycles of sterilization at 130 to 138° C., may be required. In some instances adjuvants, for example, morpholine or alkyl amines are added to the steam to prevent corrosion and protect the autoclave device and associated piping. Addition of these chemical bases to steam may further accelerate degradation of a thermoplastic resin placing even more performance demands on a suitable candidate resin.

In addition to resistance to autoclaving, such articles can also require other properties such as high impact to resist breakage in use. They also require heat resistance, in the form of a high heat distortion temperature to prevent melting or warping during sterilization. Additionally such articles will need high modulus and stiffness to give them the rigidly and strength for end use in devices such as trays, handles, bins, containers, animal cages, and connectors. In some instances having such devices that are transparent, so that the contents may be observed, is also useful.

For the foregoing reasons, there exists an unmet need for articles and compositions that have high impact strength, rigidity, resistance to deformation on exposure to heat, with the retention of properties upon repeated steam autoclaving at 130 to 138° C.

BRIEF DESCRIPTION OF THE INVENTION

Disclosed herein is a thermoplastic composition comprising a phase separated blend, wherein the phase separated blend comprises 25 to 90 weight percent of a polyetherimide and 10 to 75 weight percent of a polyphenylene ether sulfone, wherein the weight percents are based on the combined weight of the polyetherimide and the polyphenylene ether sulfone. The dispersed phase has an average cross sectional size of 0.01 to 10 micrometers. The composition has a high impact strength and toughness with a multiaxial impact energy of greater than or equal to 45 foot pounds force (ft-lbs) (61 Joules (J)). The composition demonstrates excellent hydrolytic stability by having a multiaxial impact energy of greater than or equal to 20 ft-lbs (27 J) after exposure to 130 to 138° C. steam autoclaving for 300 hours. The composition also has a tensile modulus of greater than 425,000 pounds per square inch (psi) (2,930 megaPascals (MPa)) and a heat distortion temperature (HDT) greater than or equal to 150° C. Also described herein are articles comprising the foregoing composition.

In some embodiments, a composition comprises a phase separated blend having a dispersed phase average cross sectional size as described above. The phase separated blend comprises a polyetherimide in an amount of 60 to 80 weight percent and a polyphenylene ether sulfone in an amount of 20 to 40 weight percent, based on the combined weight of polyetherimide and polyphenylene ether sulfone. The composition has an initial multiaxial impact energy of greater than or equal to 45 ft-lbs (61 J), a multiaxial impact energy of greater than or equal to 20 ft-lbs (27 J) after exposure to 130 to 138° C. steam autoclaving for 300 hours, a tensile modulus of greater than 425,000 pounds per square inch (2,930 MPa) and a heat distortion temperature (HDT) greater than or equal to 175° C. Additionally, the composition can have a percent transmission (% T) of greater than or equal to 50% at a thickness of 3.2 millimeters (mm).

In some embodiments, a composition comprises a phase separated blend having a dispersed phase average cross sectional size as described above. The phase separated blend comprises a polyetherimide in an amount of 60 to 80 weight percent and a polyphenylene ether sulfone in an amount of 20 to 40 weight percent, based on the combined weight of polyetherimide and polyphenylene ether sulfone. The polyphenylene ether sulfone comprises repeating units having the formula

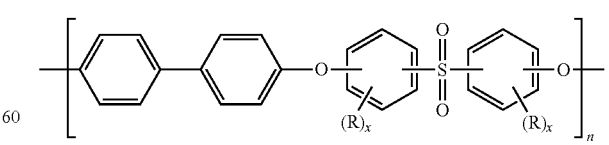

wherein R is hydrogen, alkyl, aryl, alkyl aryl, alkoxy, halogen or combination thereof, x equals 0 to 4, and n equals 25 to 1000. The aryl sulfone linkages are selected from the group consisting of 4,4' linkages, 3,3' linkages, 3,4' linkages, and mixtures thereof. The polyetherimide and the polyphenylene ether sulfone each have a weight average molecular weight of 20,000 to 70,000 and the difference in molecular weight between the two polymers is less than 20% of the higher of the two molecular weights. The composition has an initial multiaxial impact energy of greater than or equal to 45 ft-lbs (61 J), a multiaxial impact energy of greater than or equal to 20 ft-lbs (27 J) after exposure to 130 to 138° C. steam autoclaving for 300 hours, a tensile modulus of greater than 425,000 pounds per square inch (2,930 MPa) and a heat distortion temperature (HDT) greater than or equal to 175° C.

In some embodiments, a composition comprises a phase separated blend having a dispersed phase average cross sectional size as described above. The phase separated blend comprises a polyetherimide in an amount of 60 to 80 weight percent and a polyphenylene ether sulfone in an amount of 20 to 40 weight percent, based on the combined weight of polyetherimide and polyphenylene ether sulfone. The polyphenylene ether sulfone comprises repeating units having the formula

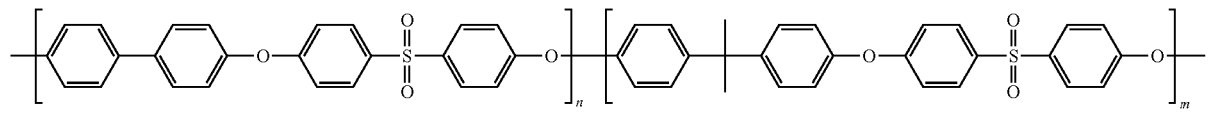

wherein n>m and n+m=25 to 100. The composition has an initial multiaxial impact energy of greater than or equal to 45 ft-lbs (61 J), a multiaxial impact energy of greater than or equal to 20 ft-lbs (27 J) after exposure to 130 to 138° C. steam autoclaving for 300 hours, a tensile modulus of greater than 425,000 pounds per square inch (2,930 MPa) and a heat distortion temperature (HDT) greater than or equal to 175° C.

BRIEF DESCRIPTION OF THE DRAWINGS

FIG. 1 is a transmission electron micrograph of Example 1.
FIG. 2 is a transmission electron micrograph of Example 2.
FIG. 3 is a transmission electron micrograph of Example 3.
FIG. 4 is a transmission electron micrograph of Example 13.

DETAILED DESCRIPTION

Figure 1:
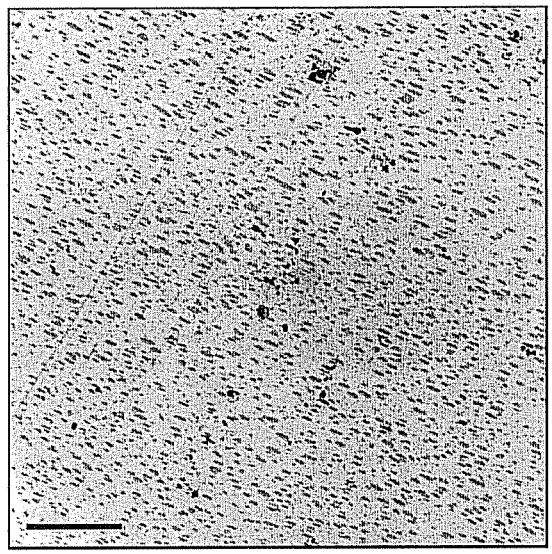
FIGS. 1 to 4 are electron micrographs of polyetherimide/polyphenylene ether sulfone blends.

The terms "first," "second," and the like, "primary," "secondary," and the like, "(a)," "(b)" and the like, as used herein do not denote any order, quantity, or importance, but rather are used to distinguish one element from another. The terms "a" and "an" do not denote a limitation of quantity, but rather denote the presence of at least one of the referenced item. "Optional" or "optionally" means that the subsequently described event or circumstance may or may not occur, and that the description includes instances where the event occurs and instances where it does not. The endpoints of all ranges directed to the same component or property are inclusive of the endpoint and independently combinable. Reference throughout the specification to "one embodiment," "another embodiment," "an embodiment," "some embodiments," and so forth, means that a particular element (e.g., feature, structure, property, and/or characteristic) described in connection with the embodiment is included in at least one embodiment described herein, and may or may not be present in other embodiments. In addition, it is to be understood that the described element(s) may be combined in any suitable manner in the various embodiments.

Compounds are described using standard nomenclature. For example, any position not substituted by any indicated group is understood to have its valency filled by a bond as indicated, or a hydrogen atom. A dash ("—") that is not between two letters or symbols is used to indicate a point of attachment for a substituent. For example, —CHO is attached through carbon of the carbonyl group.

The term "alkyl" is intended to include both $C_{1-30}$ branched and straight-chain, saturated aliphatic hydrocarbon groups having the specified number of carbon atoms. Examples of alkyl include, but are not limited to, methyl, ethyl, n-propyl, i-propyl, n-butyl, s-butyl, t-butyl, n-pentyl, s-pentyl, n- and s-hexyl, n- and s-heptyl, and, n- and s-octyl. The term "aryl" is intended to mean an aromatic moiety containing the specified number of carbon atoms, such as, but not limited to phenyl, tropone, indanyl or naphthyl.

Other than in operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

All ASTM tests were performed as required by the 2003 edition of the Annual Book of ASTM Standards unless otherwise indicated. All melt viscosity data and values were/are determined according to ASTM D1238 using condition 337 or 267° C./6.7 Kg-f on a sample dried for greater than 1 hour at 150° C. All multiaxial impact energy data and values were/are determined according to ASTM D3763 at 73° F. (23° C.) as described in the Examples section except for those data points which specify an alternate temperature. All tensile modulus data and values were/are determined according to ASTM D638 as described in the Examples section. All heat distortion temperature data and values were/are determined at 264 psi (1.8 MPa) per ASTM D648 using 3.2 millimeter (mm) thick bars. All refractive index data and values were/are determined according to ASTM D542. Percent transmittance (% T) and percent haze (% H) data and values were/are determined by ASTM D1003 using samples having a thickness of 3.2 mm.

The invention is based on the discovery that by using a specific combination of materials, in certain amounts, it is now possible to produce a composition (and articles) having a specific combination of useful properties, namely a composition (article) that initially exhibits a multiaxial impact energy of greater than or equal to 45 ft-lbs (61 J) and after 300 hours of steam autoclave exposure at 130 to 138° C., the composition (article) has a multiaxial impact energy of greater than or equal to 20 ft-lbs (27 J); the composition also has a tensile modulus of greater than or equal to 425,000 psi (2930 MPa), and a heat distortion temperature of greater than or equal to 150° C. As discussed above, phase separated blends are complex and unpredictable. Indeed, it can be very difficult to obtain a desired combination of physical properties in blends have multiple phases (phase separated blends) because modifications to the blend to affect a desired change in one property can have an unexpected negative impact on another physical property.

The composition disclosed herein comprises a phase separated blend. The phase separated blend comprises a continuous phase and a dispersed phase. The dispersed phase has an average cross section of 0.01 to 10 micrometers. Within this range the average cross section can be greater than or equal to 0.1, or, more specifically, greater than or equal to 0.3 micrometers. Also within this range the average cross section can be less than or equal to 5, or, more specifically, less than or equal to 3 micrometers. The average cross section size is determined by transmission electron microscopy of injection molded samples stained with ruthenium tetraoxide.

Having an average cross section size in the above described range shows that the resins are well mixed and that the two polymers have good chemical affinity for each other. This is translates on the macroscopic scale to good mechanical properties such as high multiaxial impact energy and high tensile elongation at break. Fine morphology and very small structural features often improve optical properties such as higher clarity seen in higher percent transmittance values. The good affinity for the two polymers is also seen in stable rheological properties giving melt blends that are easily extruded into strands for pelletization.

The composition has a melt volume rate of 1.0 to 25.0 cubic centimeters per 10 minutes (cm$^3$/10 minutes). The composition has an improved hydrolytic stability when compared to polyetherimide alone. For example, the composition retains greater than or equal to 60% of the initial melt volume rate after being exposed to steam at 110° C. for 20 days. In some embodiments the composition retains greater than or equal to 70% of the initial melt volume rate. "Initial melt volume rate" as used in this context refers to the melt volume rate of the composition immediately prior to exposure to steam at 110° C. for 20 days.

The composition also demonstrates a multiaxial impact energy of greater than or equal to 45 ft-lbs (61 J). Within this range the multiaxial impact energy can be greater than or equal to 50 ft-lbs (68 J), or, more specifically, greater than or equal to 55 ft-lbs (74 J). Also within this range the multiaxial impact energy can be less than or equal to 70 ft-lbs (95 J).

The composition has a tensile modulus of greater than or equal to 425,000 psi (2930 MPa). Within this range the tensile modulus can be greater than or equal to 450,000 psi (3103 MPa) or, more specifically, greater than or equal to 500,000 psi (3447 MPa). In some embodiment the tensile modulus is less than or equal to 600,000 (4137 MPa).

Additionally, the composition has a heat distortion temperature of greater than or equal to 150° C., or, more specifically, greater than or equal to 175° C., or, even more specifically greater than or equal to 190° C. The heat distortion temperature can be less than or equal to 300° C.

In some embodiments, particularly those in which the composition is free of pigment, the composition has a refractive index (RI) of 1.620 to 1.670. In some embodiments both the polyphenylene ether sulfone and the polyetherimide have an RI of 1.620 to 1.670. Within this range the refractive index can be greater than or equal to 1.625, or, more specifically, greater than or equal to 1.630. Also within this range the refractive index can be less than or equal to 1.665, or, more specifically, less than or equal to 1.660.

In some embodiments, the composition comprises a transparent phase separated blend. The percent transmittance (% T) on a 3.2 mm thick article can be greater than or equal to 50%, or, more specifically, greater than or equal to 70%. The % T can be less than 90%. Percent haze (% H) can be less than or equal to 10%, or, more specifically, less than or equal to 5%.

It is also important that the polyetherimide/polyphenylene ether sulfone blends show good melt compatibility such that when compounded or extruded they can be formed into strands and pelletized without excessive die swell, surging, delamination, skinning, or strand breakage.

Polyetherimide resins may comprise more than 1, typically 10 to 1000, or, more specifically, 10 to 500 structural units, of the formula (1)

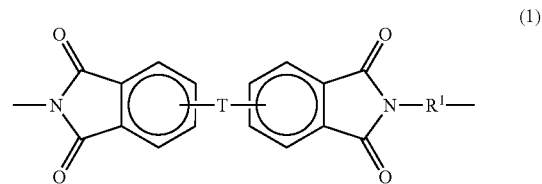

wherein R$^1$ includes but is not limited to substituted or unsubstituted divalent organic groups such as: (a) aromatic hydrocarbon groups having 6 to 24 carbon atoms and halogenated derivatives thereof; (b) straight or branched chain alkylene groups having 2 to 20 carbon atoms; (c) cycloalkylene groups having 3 to 24 carbon atoms, or (d) divalent groups of formula (2) defined below. T is —O— or a group of the formula —O—Z—O— wherein the divalent bonds of the —O— or the —O—Z—O— group are in the 3,3', 3,4', 4,3', or the 4,4' positions. Z includes, but is not limited to, substituted or unsubstituted divalent organic groups such as: (a) aromatic hydrocarbon groups having about 6 to about 20 carbon atoms and halogenated derivatives thereof; (b) straight or branched chain alkylene groups having about 2 to about 20 carbon atoms; (c) cycloalkylene groups having about 3 to about 20 carbon atoms, or (d) divalent groups of the general formula (2);

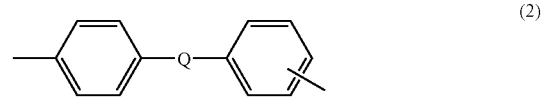

wherein Q includes but is not limited to a divalent moiety selected from the group consisting of —O—, —S—, —C(O)—, —SO$_2$—, —SO—, —C$_y$H$_{2y}$— (y being an integer from 1 to 8), and fluorinated derivatives thereof, including perfluoroalkylene groups. Z may comprise exemplary divalent groups of formula (3)

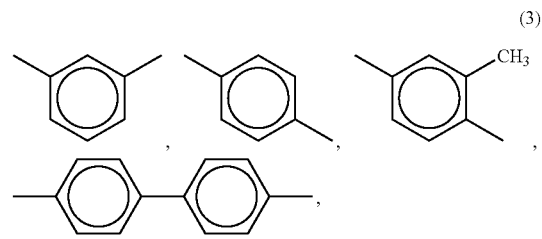

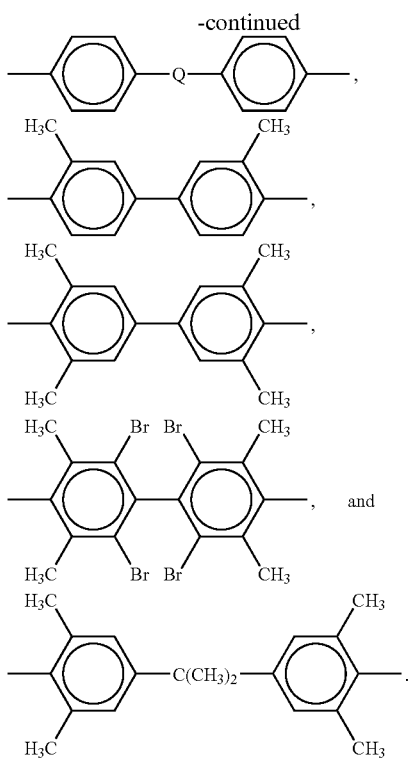

In some embodiments, the polyetherimide may be a copolymer. Mixtures of polyetherimides may also be employed.

The polyetherimide can be prepared by any of the methods well known to those skilled in the art, including the reaction of an aromatic bis(ether anhydride) of the formula (4)

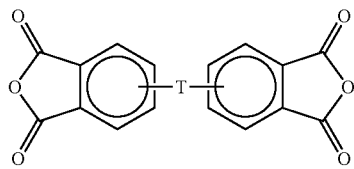

(4)

with an organic diamine of the formula (5)

$$H_2N-R^1-NH_2 \quad (5)$$

wherein T and $R^1$ are defined as described above.

Examples of specific aromatic bis anhydrides and organic diamines are disclosed, for example, in U.S. Pat. Nos. 3,972,902 and 4,455,410. Illustrative examples of aromatic bis anhydrides include:
3,3-bis[4-(3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
4,4'-bis(3,4-dicarboxyphenoxy)benzophenone dianhydride;
4,4'-bis(3,4-dicarboxyphenoxy)diphenyl sulfone dianhydride;
2,2-bis[4-(2,3-dicarboxyphenoxy)phenyl]propane dianhydride;
4,4'-bis(2,3-dicarboxyphenoxy)diphenyl ether dianhydride;
4,4'-bis(2,3-dicarboxyphenoxy)diphenyl sulfide dianhydride;
4,4'-bis(2,3-dicarboxyphenoxy)benzophenone dianhydride;
4,4'-bis(2,3-dicarboxyphenoxy)diphenyl sulfone dianhydride;
4-(2,3-dicarboxyphenoxy)-4'-(3,4-dicarboxyphenoxy)diphenyl-2,2-propane dianhydride;
4-(2,3-dicarboxyphenoxy)-4'-(3,4-dicarboxyphenoxy)diphenyl ether dianhydride;
4-(2,3-dicarboxyphenoxy)-4'-(3,4-dicarboxyphenoxy)diphenyl sulfide dianhydride;
4-(2,3-dicarboxyphenoxy)-4'-(3,4-dicarboxyphenoxy)benzophenone dianhydride; and,
4-(2,3-dicarboxyphenoxy)-4'-(3,4-dicarboxyphenoxy)diphenyl sulfone dianhydride, as well as various mixtures thereof.

Another class of aromatic bis(ether anhydride)s included by formula (4) above includes, but is not limited to, compounds wherein T is of the formula (6)

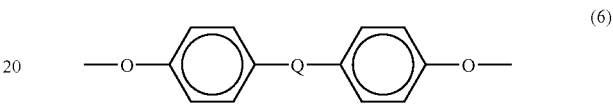

(6)

and the ether linkages, while shown in the 4,4' positions may also be in the 3,3', 3,4', or 4,3' positions and where Q is as defined above.

Examples of organic diamines include ethylenediamine, propylenediamine, trimethylenediamine, diethylenetriamine, triethylene tetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl)amine, 3-methoxyhexamethylenediamine, 1,2-bis(3aminopropoxy) ethane, bis(3-aminopropyl)sulfide, 1,4-cyclohexanediamine, bis-(4-minocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl)methane, bis(2-chloro-4-amino-3,5-diethylphenyl)methane, bis(4-aminophenyl)propane, 2,4-bis(p-amino-t-butyl)toluene, bis(p-amino-t-butylphenyl) ether, bis(p-methyl-o-aminophenyl) benzene, bis(p-methyl-o-aminopentyl)benzene, 1,3-diamino-4-isopropylbenzene, bis(4-aminophenyl)sulfide, bis-(4-aminophenyl) sulfone, and bis(4-aminophenyl)ether. Mixtures of these compounds may also be used. In some embodiments the organic diamine comprises m-phenylenediamine, p-phenylenediamine, sulfonyl dianiline, or a combination comprising one or more of the foregoing.

In one embodiment, the polyetherimide resin comprises structural units according to formula (1) wherein each $R^1$ is independently p-phenylene or m-phenylene or a mixture thereof and T is a divalent group of the formula (7)

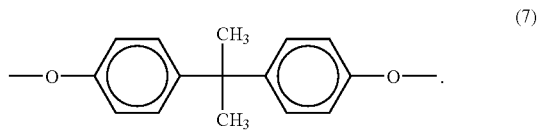

(7)

Included among the many methods of making polyetherimides are those disclosed in U.S. Pat. Nos. 3,847,867, 3,852, 242, 3,803,085, 3,905,942, 3,983,093, 4,443,591 and 7,041, 773. These patents mentioned for the purpose of teaching, by way of illustration, general and specific methods for preparing polyimides. Some polyetherimide (PEI) materials are described in ASTM D5205-96 Standard Classification System for Polyetherimide Materials.

Polyetherimides may have a melt index of 0.1 to 10 grams per minute (g/min), as measured by American Society for Testing Materials (ASTM) D1238 at 340 to 370° C., using a 6.7 kilogram (kg) weight. In some embodiments, the polyetherimide resin has a weight average molecular weight (Mw) of 10,000 to 150,000 grams per mole (g/mole), as measured by gel permeation chromatography, using polystyrene standards. In some embodiments the polyetherimide has Mw of 20,000 to 70,000. Such polyetherimide resins typically have an intrinsic viscosity greater than 0.2 deciliters per gram (dl/g), or, more specifically, 0.35 to 0.7 dl/g as measured in m-cresol at 25° C.

The polyetherimide is present in an amount of 25 to 90 weight percent, based on the combined weight of polyetherimide and polyphenylene ether sulfone. Within this range the polyetherimide may be present in an amount greater than or equal to 50 weight percent, or, more specifically, greater than or equal to 60 weight percent. Also within this range the polyetherimide may be present in an amount less than or equal to 90 weight percent, or, more specifically, less than or equal to 85 weight percent.

Polyphenylene ether sulfones comprise repeating units having both an ether linkage and an aryl sulfone linkage in the backbone of the polymer as shown in formula (8)

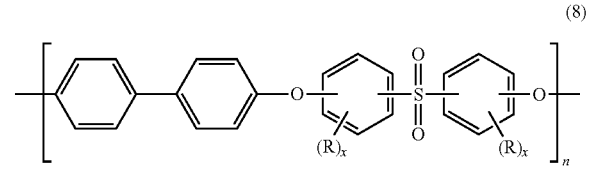

(8)

wherein R is hydrogen, alkyl, aryl, alkyl aryl, alkoxy, halogen or combination thereof, x equals 0 to 4, and n equals 25 to 1000, or, more specifically, n equals 25 to 500, or, more specifically, n equals 25 to 100. The aryl sulfone linkages may be 4,4', 3,3', 3,4' or mixtures thereof. In some embodiments the aryl sulfone linkages are 4,4' diaryl sulfone. In some embodiments greater than or equal to 50 mole percent of the main chain sulfone linkages are derived from biphenol.

An exemplary biphenol polyphenylene ether sulfone is shown in formula (9)

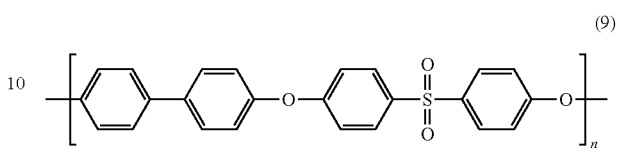

(9)

wherein n is as defined above.

In some embodiments, the polyphenylene ether sulfone is a polyphenylene ether sulfone copolymer of formula (10)

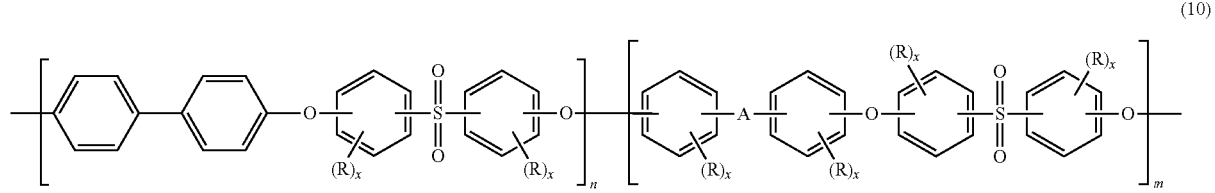

(10)

wherein A is a linking group selected from, —O—, —S—, —SO$_2$—, C$_6$-C$_{18}$ aryl, and C$_3$-C$_{12}$ alkyl. In some embodiments A is isopropylidene. Linkages of A to the aryl groups may be at the 4,4', 3,3', 3,4' positions or mixtures thereof. In many embodiments the linkages are at the 4,4' positions. R and x are defined as above; n>m, and n+m equals 20 to 1000, or, more specifically n+m equals 25 to 500, or, even more specifically, n+m equals 25 to 100. Aryl sulfone linkages may be at the 4,4', 3,3', 3,4' positions or mixtures thereof. In many embodiments the linkages are at the 4,4' positions. In some embodiments the polyphenylene ether sulfones have n equal to 70% and m equal to 30% based on the total of n+m. In some embodiments n equals 80% and m equals 20%, based on the total of n+m.

Exemplary aromatic dihydroxy compounds that can be used to make the polyphenylene ether sulfone copolymers include bisphenols and biphenols such as bisphenol A, dimethyl cyclohexyl bisphenol, dihydroxy diphenyl ether, hydroquinone, methyl hydroquinone and 4,4'-biphenol. Other exemplary aromatic dihydroxy compounds are disclosed in U.S. Patent Publication Nos. 2006/0167216, 2005/0113558, and 2006/0069236.

The polyphenylene ether sulfone can comprise a homopolymer, copolymer, or combination thereof. Copolymers include random copolymers, non-random copolymers and block copolymers.

An example of a polyphenylene ether sulfone copolymer is shown below in formula (11)

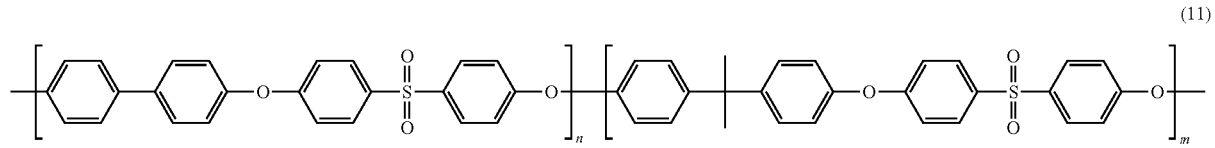

(11)

wherein n>m, n+m=25 to 100, A (from formula (10)) is isopropyl, all aryl linkages are at the 4,4' positions and R (from formula (10)) is hydrogen.

Polyphenylene ether sulfones are commercially available, including the polycondensation product of biphenol with dichloro diphenyl sulfone. An example is PPSU resin is RADEL™ R, available from Solvay, Inc.

Methods for the preparation of polyphenylene ether sulfones are widely known and several suitable processes have been well described in the art. Two methods, the carbonate method and the alkali metal hydroxide method, are known to the skilled artisan. In the alkali metal hydroxide method, a double alkali metal salt of a dihydric phenol is contacted with a dihalobenzenoid compound in the presence of a dipolar, aprotic solvent under substantially anhydrous conditions. The carbonate method, in which a dihydric phenol and a dihalobenzenoid compound are heated, for example, with sodium carbonate or bicarbonate and a second alkali metal carbonate or bicarbonate is also disclosed in the art, for example in U.S. Pat. Nos. 4,176,222. Alternatively, the polyphenylene ether sulfone may be prepared by any of the variety of methods known in the art including those described in the U.S. Patent Publications referenced above.

The molecular weight of the polyphenylene ether sulfone, as indicated by reduced viscosity data in an appropriate solvent such as methylene chloride, chloroform, N-methylpyrrolidone, or the like, can be greater than or equal to 0.3 dl/g, or, more specifically, greater than or equal to 0.4 dl/g and, typically, will not exceed 1.5 dl/g.

The polyphenylene ether sulfone weight average molecular weight can be 10,000 to 100,000 grams per mole (g/mol) as determined by gel permeation chromatography using ASTM D5296 with polystyrene standards. In some embodiments the polyphenylene ether sulfone weight average molecular weight can be 20,000 to 70,000 grams per mole (g/mol). Polyphenylene ether sulfones may have glass transition temperatures of 180 to 250° C.

The polyphenylene ether sulfone is present in an amount of 10 to 75 weight percent, based on the combined weight of the polyetherimide and the polyphenylene ether sulfone. Within this range the poly polyphenylene ether sulfone may be present in an amount greater than or equal to 20 weight percent, or, more specifically, greater than or equal to 30 weight percent. Also within this range the polyphenylene ether sulfone may be present in an amount less than or equal to 60 weight percent or, more specifically, less than or equal to 50 weight percent.

Another aspect of the invention is a method to make polyphenylene ether sulfones/polyetherimide blends with the stability needed for melt processing such that there is relatively little molecular weight change during the melting and article forming procedure. This requires that each polymer be essentially free of linkages that will react in the melt to change molecular weight. The presence of benzylic protons in polyphenylene ether sulfones and polyetherimides typically accelerates reactions that change the polymer's molecular weight in the melt. Due to the increased melt stability of the resultant polymer, polyphenylene ether sulfone and polyetherimide blends with structural units derived from aromatic diamines, aromatic dianhydrides, bisphenols, or diaryl sulfones and capping agents essentially free of benzylic protons may be preferred in some applications, especially those involving isolation from the melt and melt processing after polymerization. As used herein "essentially free of benzylic protons" means that the polyphenylene ether sulfones and polyetherimides have less than 5 mole % of structural units, or, less than 3 mole % structural units, or, less than 1 mole % structural units derived from monomers and/or end cappers containing benzylic protons. In one embodiment the polyphenylene ether sulfone and the polyetherimide are free of benzylic protons.

Polyetherimides and polyphenylene ether sulfones can have low levels of residual volatile species, such as residual solvent and/or water. In some embodiments, the polyetherimide and the polyphenylene ether sulfone each have a residual volatile species concentration of less than 1000 parts by weight per million parts by weight (ppm), or, more specifically, less than 500 ppm, or, more specifically, less than 300 ppm, or, even more specifically, less than 100 ppm. In some embodiments, the composition has a residual volatile species concentration of less than 1000 parts by weight per million parts by weight (ppm), or, more specifically, less than 500 ppm, or, more specifically, less than 300 ppm, or, even more specifically, less than 100 ppm.

Examples of residual volatile species are halogenated aromatic compounds such as chloro benzene, dichloro benzene, trichloro benzene, aprotic polar solvents such as dimethyl formamide (DMF), N-methylpyrrolidinone (NMP), dimethyl sulfoxide (DMSO), diaryl sulfones, sulfolane, pyridine, phenol, veratrole, anisole, cresols, xylenols, dichloro ethanes, tetra chloro ethanes, pyridine and mixtures thereof.

Low levels of residual volatile species in the final polymer product can be achieved by known methods, for example, by devolatilization or distillation. In some embodiments the bulk of any solvent may be removed and any residual volatile species may be removed from the polymer product by devolatilization or distillation, optionally at reduced pressure. In other embodiments the polymerization reaction is taken to some desired level of completion in solvent and then the polymerization is essentially completed and most remaining water is removed during at least one devolatilization step following the initial reaction in solution. Apparatuses to devolatilize the polymer mixture and reduce solvent and other volatile species to the low levels needed for good melt processability are generally capable of high temperature heating under vacuum with the ability to rapidly generate high surface area to facilitate removal of the volatile species. The mixing portions of such apparatuses are generally capable of supplying sufficient power to pump, agitate and stir the high temperature, amorphous polyphenylene ether sulfone and polyetherimide melt which may be very viscous. Suitable devolatilization apparatuses include, but are not limited to, wiped films evaporators, for example those made by the LUWA Company and devolatilizing extruders, especially twin screw extruders with multiple venting sections, for example those made by the Werner Pfleiderer Company or Welding Engineers.

In some blends the polyetherimide and the polyphenylene ether sulfone each have a weight average molecular weight (Mw) of 20,000 to 70,000 grams per mole (g/mol) where the difference in molecular weight between the two polymers is less than 20% of the higher of the molecular weights. In some embodiments the difference in molecular weight between the two polymers is less than 10% of the higher of the molecular weights. Having a large difference in Mw between the polyetherimide and polyphenylene ether sulfone resin components can cause problems during melt blending and extrusion, e.g., surging and die swell that prevent efficient compounding and pelletization of the blends. Melt processing is facilitated by having a small, e.g., less than 20%, molecular weight difference between the polymers.

In some embodiments the polyetherimide has a glass transition temperature of 200 to 280° C. and the polyphenylene ether sulfone has a glass transition temperature of 200 to 250° C.

It is often useful to melt filter the polyetherimide and polyphenylene ether sulfone resins using known melt filtering techniques to remove foreign material, carbonized particles, crosslinked resin, or similar impurities. Melt filtering can occur during initial resin isolation or in a subsequent step. Blends of polyetherimide and polyphenylene ether sulfones or polyphenylene ether sulfone copolymers, can be melt filtered in the same extrusion operation where they are blended together. Melt filtering can be performed using a filter with pore size sufficient to remove particles with a dimension of greater than or equal to 100 micrometers or with a pore size sufficient to remove particles with a dimension of greater than or equal to 40 micrometers.

The composition may optionally comprise additives such as UV absorbers; stabilizers such as light stabilizers and others; lubricants; plasticizers; pigments; dyes; colorants; anti-static agents; foaming agents; blowing agents; metal deactivators; and combinations comprising one or more of the foregoing additives. Antioxidants can be compounds such as phosphites, phosphonites, hindered phenols or mixtures thereof. Phosphorus containing stabilizers including triaryl phosphite and aryl phosphonites are of note as useful additives. Difunctional phosphorus containing compounds can also be employed. In some embodiments, to prevent loss of the stabilizer during melt mixing or subsequent melt forming processes such as injection molding, the phosphorus containing stabilizers with a molecular weight greater than or equal to 500 g/mole, but less than or equal to 5,000 g/mole, are useful. The additive can comprise hindered phenols with molecular weight over 500 g/mole. In some embodiments, the additive can include mixtures of a mold release agent and a stabilizer selected from the group consisting of phosphite stabilizers, phosphonite stabilizers, hindered phenol stabilizers, and combinations thereof. Phosphorus containing stabilizers may be present in the composition at 0.01 to 1.0% by weight of the total composition.

The composition can optionally comprise a mold-release agent. Examples of the mold-release agents include, but are not limited to, natural and synthetic paraffins, polyethylene waxes, fluorocarbons, and other hydrocarbon mold-release agents; stearic acid and other higher fatty acids; stearic acid amide, ethylene bis stearamide, and other fatty acid amides, alkylene bis fatty acid amides, and other fatty acid amide mold-release agents; butyl stearate, pentaerythritol tetrastearate, and other alcohol esters of fatty acid, polyhydric alcohol esters of fatty acid, and other fatty acid ester mold release agents; silicone oil and other silicone mold release agents, and mixtures of any of the aforementioned. In some embodiments 0.01 to 5.0 weight percent, based on the total weight of the composition, of a mold release agent selected from the group consisting of $C_{15}$ to $C_{30}$ carboxylic acids, $C_{15}$ to $C_{30}$ aliphatic carboxylic amides and mixtures thereof are employed. The mold release agent can be used in conjunction with other additives, e.g., polytetrafluoroethylene, fiber glass, minerals, including nano scale minerals, pigments, colorants, carbon fibers, ceramic fibers.

The amount of the mold release agent can be greater than or equal to 0.1 weight percent, based on the total weight of the composition. In one embodiment, the amount of the mold release agent is 0.1 to 2 weight percent, based on the total weight of the composition. In another embodiment, the amount of the mold release agent is 0.3 to 1 weight percent, based on the total weight of the composition.

The polyetherimide/polyphenylene ether sulfone blends may also comprise other polymers such as polysulfones, polyethersulfones, silicone polyetherimides, polyamides, polyphenylene ethers, polyolefins, and mixtures thereof, provided that they are used in such amount as not to compromise the multiaxial impact energy, tensile modulus and heat distortion temperature properties enumerated herein. In some embodiments such polymers can be added to the composition in amounts of 1 to 40 weight percent, or, 1 to 30 weight percent, or, 1 to 20 weight percent, based on the total weight of the composition.

The thermoplastic composition can be prepared by melt mixing or a combination of dry blending and melt mixing. Melt mixing can be performed in single or twin screw type extruders or similar mixing devices that can apply a shear and heat to the components. Melt mixing can be performed at temperatures greater than or equal to the melting temperatures of the polyetherimide and polyphenylene ether sulfone and less than the degradation temperatures of any of the components of the composition. In some embodiments suitable melt mixing is achieved at a temperature of 125 to 150° C. above the highest glass transition temperature of the two polymers.

All of the ingredients may be added initially to the processing system. In some embodiments, the ingredients may be added sequentially or through the use of one or more master batches.

The compositions described above can be used to make articles (including portions of articles). Articles can be made by any suitable method, e.g., injection molding, compression molding, sintering, thermoforming, blow molding, profile extrusion, melt spinning, gas assist molding, foam molding, rotomolding, solvent casting, and the like.

Exemplary articles comprising the polyetherimide/polyphenylene ether sulfone composition include molded parts, sheets, slabs, profiles, films or fibers. The articles can also include medical devices, membranes, surgical instrument trays, handles, animal cages, part of a water supply, sterilization or decontamination system, part of a device or system for collecting, transporting or handling beer, wine, milk, cheese, or other dairy products. When part of a hot water supply, or aqueous solution, or emulsion handling system, the article may be particularly useful especially where the use temperature is equal to or greater than 40° C., or greater than or equal to 80° C. Such articles can be used in food preparation especially where moisture and high temperatures are encountered.

Articles can also be a lighting device, reflector, metallized reflector, helmet or other protective device, fire helmets, face shields, safety glasses, eyeglasses. The article can also be any energy absorbing safety devices. Articles may also be used in food service, storage or preparation. Our composition will be especially useful in any article requiring steam sterilization after use, especially repeated sterilization.

EXAMPLES

The compositions are further described by the following non-limiting examples.

Examples 1-15 and Comparative Examples A-I

The materials used in the Examples are described below.
PEI is ULTEM 1000 polyetherimide commercially available from GE Plastics, Mw=55,000 (GPC, PS standards), refractive index=1.6586 (measured at 633 nanometers and 23° C.), Tg=221° C. PEI contained 0.1 weight percent hindered phenol (IRGANOX 1010) and 0.1 weight percent tris (di-2,4-tert butyl phenyl) phosphite (IRGAPHOS 168).

PEIS is a polysulfone etherimide made from the reaction of bisphenol-A dianhydride (BPADA) with about an equal molar amount of 4,4'-diamino diphenyl sulfone (DDS), Mw approximately 34,000, Tg=248° C., refractive index=1.6611 (measured at 633 nanometers at 23° C.).

PPSU=RADEL R 5100 commercially available from Solvay, Mw=49,600 (GPC, PS standards), refractive index=1.6673 (measured at 633 nanometers at 23° C.), Tg=224° C.

PPSU-PSU is a copolymer having 80 mole % biphenylene 4,4'-diphenyl sulfone linkages and 20 mole % bisphenol-A-4,4'-diphenyl sulfone linkages and made as per US Patent Publication Nos. 2005/0113558, 2006/0069236 and 2006/0167216, Mw=51,000 (GPC, PS standards), refractive index=1.6673 (measured at 633 nanometers at 23° C.), Tg=217° C.

PSU=UDEL P1700 (a BPA polysulfone) commercially available from Solvay, Mw=66,500 (GPC, PS standards), Tg=192° C.

Techniques & Procedures

The techniques and procedures used in the Examples are described below.

Gel permeation chromatography (GPC) was done as per ASTM D5296 and polystyrene standards were used for calibration.

Blends were prepared by extruding of mixtures of the polyphenylene ether sulfones and polyetherimides in a 2.5 inch (63.5 mm) single-screw vacuum vented extruder. Compositions are listed in weight percent based on the total weight of the composition except where noted otherwise. The extruder was set at about 325 to 360° C. The blends were run at about 180 rotations per minute (rpm) under vacuum using a mild mixing screw; vacuum was approximately 20 inches (508 mm) of mercury (Hg). In some instances the blend was melt filtered using a 40 micrometers filter. The extrudate was cooled, pelletized and dried at 135° C. Test samples were injection molded at a set temperature of 350 to 375° C. and mold temperature of 120° C., a screw speed of approximately 60 rpm, with 50 psi (0.345 Mpa) back pressure using a 30 seconds cycle time.

Properties were measured using ASTM test methods. All molded samples were conditioned for at least 48 hours at 50% relative humidity prior to testing. Heat distortion temperature (HDT) was measured at 264 psi (1.8 Mpa) on 3.2 mm thick bars as per ASTM D648. Tensile properties were measured on 3.2 mm type I bars as per ASTM method D638, cross head speed was 5 millimeters/minute. Tensile modulus was measured as tangent. Tensile modulus is reported in Kpsi where Kpsi=psi/1000. Melt volume rate was tested at 337° C. and 6.7 kilograms (kg) in accordance with ASTM D1238. Samples were dried for more than 1 hour at 150° C. prior to melt viscosity testing. Percent transmittance (% T) and percent haze (% H) were measured as per ASTM D1003 on 3.2 mm thick injection molded samples. Multiaxial impact energy was measured as total energy according to ASTM D3763 on 102×3.2 mm discs using a DYNATUP apparatus; velocity was 3.3 meters/second.

Autoclave testing was done on injection molded parts at 134° C. using steam containing 50 ppm morpholine. Samples were tested after 250, 500, 750 and 1000 cycles. For each cycle steam exposure time was 20 minutes.

Transmission electron micrographs were obtained for some examples. The samples were microtomed from injection molded bars in a direction perpendicular to flow. The microtomed sections were stained with ruthenium tetraoxide (RuO$_4$). The lighter continuous phase is the polyetherimde. The darker phase is the polyphenylene ether sulfone. The black bar in each figure represents 0.5 micrometers (microns).

Letters designate comparative examples and numbers designate inventive examples.

Examples 1, 2 And 3; Comparative Examples A, B, C, and D

The purpose of Examples 1, 2 and 3 was to evaluate how different inventive blends performed as compared to PPSU and PEI, individually, as well as how inventive blends performed as compared to other blends of PEI and PPSU. More particularly, Table 1 shows molded properties of PPSU (control A), PEI (control B) as well as their blends.

TABLE 1

|  | A | B | C | D | 1 | 2 | 3 |
|---|---|---|---|---|---|---|---|
| PEI | 0 | 100 | 97 | 95 | 80 | 70 | 60 |
| PPSU | 100 | 0 | 3 | 5 | 20 | 30 | 40 |
| Tensile Strength at Yield in Kpsi (MPa) | 10.7 (74) | 15.3 (105) | 15.2 (105) | 15.1 (104) | 14.5 (100) | 14.2 (98) | 13.7 (94) |
| Tensile Modulus in Kpsi (MPa) | 405 (2792) | 547 (3771) | 545 (3758) | 545 (3758) | 536 (3696) | 530 (3654) | 502 (3461) |
| Tensile Elongation at Break (%) | 94 | 93 | 71 | 75 | 83 | 89 | 100 |
| Multiaxial impact energy at 73° F. (23° C.) in ft-lbs (J) | 59 (80) | 35 (47) | 42 (57) | 37 (50) | 61 (83) | 64 (87) | 69 (94) |
| Multiaxial impact energy at 32° F. (0° C.) in ft-lbs (J) | 62 (84) | 38 (51) | 33 (45) | 36 (49) | 72 (98) | 68 (92) | 74 (100) |
| HDT 264 psi (1.8 MPa) in ° C. | 199 | 194 | 195 | 195 | 196 | 196 | 197 |
| Yellowness Index | 43 | 81 | 79 | 79 | 77 | 76 | 73 |
| % Haze | 2.2 | 1.5 | 2.0 | 2.1 | 4.4 | 7.2 | 4.6 |
| % Transmission | 68 | 63 | 64 | 64 | 63 | 61 | 63 |
| Melt Flow Rate (g/10 min) | 8.7 | 10.20 | 7.2 | 7.5 | 9.8 | 9.7 | 10.1 |

The PPSU (control A) showed very low tensile strength and tensile modulus below 425 Kpsi. The PEI (control B) was deficient in impact strength for many applications with multiaxial impact energy below 45 ft-lbs. Addition of 3 or 5 wt. % PPSU (controls C and D) had little beneficial effects.

Figure 2:
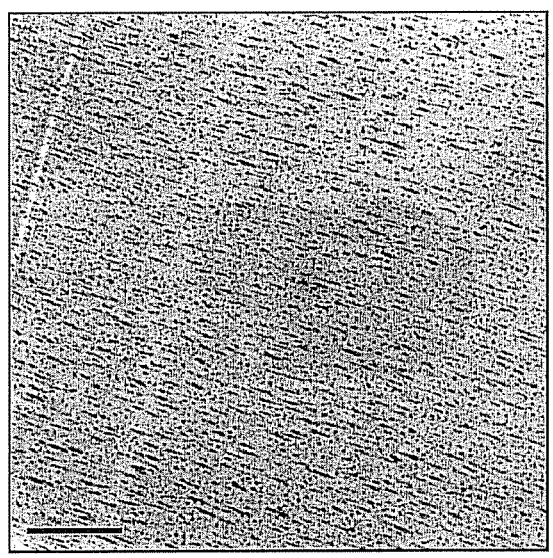
Figure 3:
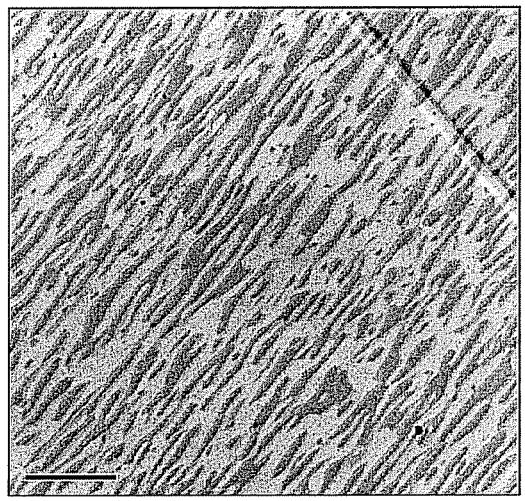

By contrast, the blends with higher amounts of PPSU (Examples 1, 2 and 3) showed a good balance of impact and stiffness, with multiaxial impact energy higher than either PEI or PPSU. Modulus was much improved over PPSU. The blends used in Examples 1, 2 and 3 also showed good elongation at break (greater than 50%). Heat distortion under a heavy load (264 psi, 1.8 MPa) is still very good, (greater than 195° C.). Blends of Examples 1, 2 and 3 were easy to extrude and gave uniform strands that did not show die swell or surging seen in other PEI-Polysulfone blends. In addition the polymer blends were surprising clear with a % T of >70% and a percent haze of less than 10%. This was even more surprising when electron microscopy showed the blend to be phase separated (FIGS. 1, 2 and 3) with a very fine phase structure (average cross sectional size less than about 5 microns). A reduction in Yellowness Index (YI) from 81 to 73-77 resulted as a function of adding PPSU to PEI.

Autoclave Testing

Injection molded articles of Examples A, B, 1, 2 and 3 were subjected to autoclave testing at 134° C. using steam containing 50 ppm morpholine. Samples were tested after 250, 500, 750 and 1000 cycles. For each cycle steam exposure time was 20 minutes. The articles were tested for tensile and multiaxial impact energy properties. Results are shown in Table 2.

TABLE 2

| | Cycles | | | | |
|---|---|---|---|---|---|
| | 0 | 250 | 500 | 750 | 1000 |
| | | | Hours in Autoclave | | |
| | 0 hours | 83.3 hours | 166.7 hours | 250 hours | 333.3 hours |
| | Autoclave Testing: Multiaxial Impact Energy Total Energy in ft-lbs (J) | | | | |
| B | 35.0 (47) | 5.2 (7) | 7.3 (10) | 7.6 (10) | 6.7 (9) |
| EX 1 | 61.2 (83) | 54.0 (73) | 44.5 (60) | 24.6 (33) | 24.4 (33) |
| EX 2 | 63.8 (86) | 56.5 (77) | 39.1 (53) | 45.3 (61) | 39.6 (54) |
| EX 3 | 69.0 (93) | 62.0 (84) | 57.2 (77) | 61.0 (83) | 58.1 (79) |
| A | 59.2 (80) | 56.5 (77) | 57.6 (78) | 55.6 (75) | 57.6 (78) |
| | Autoclave Testing: Tensile Modulus in Kpsi (MPa) | | | | |
| B | 549 (3785) | 559 (3854) | 527 (3634) | 534 (3682) | 533 (3675) |
| EX 1 | 536 (3695) | 495 (3413) | 524 (3613) | 534 (3682) | 514 (3544) |
| EX 2 | 530 (3654) | 511 (3523) | 466 (3213) | 494 (3406) | 502 (3461 |
| EX 3 | 502 (3461) | 492 (3392) | 469 (3234) | 488 (3365) | 502 (3461) |
| A | 399 (2751) | 382 (2634) | 383 (2641) | 383 (2641) | 379 (2613) |
| | Autoclave Testing: Elongation at Break in % | | | | |
| B | 93 | 28 | 19 | 13 | 11 |
| EX 1 | 83 | 29 | 22 | 26 | 18 |
| EX 2 | 89 | 55 | 30 | 36 | 29 |
| EX 3 | 100 | 71 | 56 | 43 | 57 |
| A | 94 | 76 | 85 | 65 | 89 |

As can be seen in Table 2 the PEI (B) had high tensile modulus which was retained after autoclaving, but the multiaxial impact energy and elongation at break decreased on exposure to 134° C. steam after a little as 250 cycles. The PPSU (A) showed good retention of impact but had low tensile modulus.

By contrast, Examples 1, 2 and 3 showed that multiaxial impact energy that was higher than either control. Even after 1000 cycles multiaxial impact strength was still greater than 20 ft-lbs (27 J) even with as little as 20 weight percent PPSU in the blend (Example 1). Examples 1, 2 and 3 had all retained their superior tensile modulus and show superior elongation at break than the PEI (B) after 134° C. steam exposure. The blends (Examples 1, 2 and 3) all had good retention of initial transparency and low haze after autoclaving.

Comparative Examples E, F and G

The purpose of Comparative Examples E, F, and G was to evaluate the performance of PEI and PSU blends. In a series of control experiments (Examples E, F and G) blends of PEI and PSU were examined. Results are shown in Table 3.

TABLE 3

| | E | F | G |
|---|---|---|---|
| PSU | 20 | 30 | 40 |
| PEI | 80 | 70 | 60 |

Blends E, F and G surged and swelled at the die when extruded and could not be processed into pellets The results showed that as opposed to the PEI-PPSU blends the PEI-PSU blends showed very poor extrusion capability, the blends surged and showed die swell and could not be stranded for cutting into pellets. The PEI-PSU blends were opaque and pearlescent.

Examples 4, 5, and 6

The purpose of Examples 4, 5 and 6 was to show how blends of PPSU-PEI performed after being exposed to aging conditions. Table 4 shows blends of PPSU-PEI (Examples 4, 5 and 6) that were aged in a pressure cooker at 110° C. for 20 days using deionized water.

TABLE 4

| | B | 4 | 5 | 6 |
|---|---|---|---|---|
| PEI | 100 | 90 | 50 | 10 |
| PPSU | | 10 | 50 | 90 |
| MVR 0 Day | 7.2 | 8.8 | 8.2 | 6.6 |
| MVR 20 Days | 11.1 | 11.0 | 8.1 | 6.8 |
| % Change | 54 | 25 | 1 | 3 |

The results show that the melt volume rate (MVR) measured at 337° C. and reported in cm³/10 minutes showed a large increase for the PEI control (B) indicating degradation of the PEI polymer. The PEI-PPSU blends of Examples 4, 5 and 6 showed much smaller change of MVR indicating better stability when exposed to 110° C. steam. Even a low level (10 weight percent) of PPSU gave protection against MVR loss.

Examples 7-12

The purpose of Examples 7-12 was to evaluate the performance of PEI-PPSU blends. Results are shown in Table 5.

TABLE 5

|  | 7 | 8 | 9 | 10 | 11 | 12 |
|---|---|---|---|---|---|---|
| PEI | 80.0 | 79.8 | 75.0 | 74.8 | 60.0 | 59.8 |
| PPSU | 20.0 | 20.0 | 25.0 | 25.0 | 40.0 | 40.0 |
| Erucamide | — | 0.2 | — | — | — | — |
| Stearic Acid | — | — | — | 0.2 | — | 0.2 |
| Tensile Strength at Yield in Kpsi (MPa) | 14.5 (100) | 14.7 (101) | 14.5 (100) | 14.3 (99) | 13.9 (96) | 14.2 (98) |
| Tensile Modulus in Kpsi (MPa) | 536 (3695) | 525 (3620) | 492 (3392) | 491 (3385) | 484 (3337) | 490 (3378) |
| Tensile Elongation at Break in % | 83 | 90 | 93 | 95 | 93 | 95 |
| Multiaxial Impact Energy |  |  |  |  |  |  |
| Total Energy @ 73° F. (23° C.) in ft-lbs (J) | 61.2 (83) | 63.3 (86) | 44.8 (61) | 50.4 (68) | 56.6 (77) | 62.6 (85) |
| Total Energy @ 32° F. (0° C.) in ft-lbs (J) | 72.1 (98) | 60.7 (82) | 54.6 (74) | 50.5 (68) | 64.4 (87) | 60.0 (81) |
| Total Energy @ −4° F. (−20° C.) in ft-lbs (J) | 45.8 (62) | 43.3 (59) | 52.8 (72) | 48.1 (65) | 60.5 (82) | 58.8 (80) |
| HDT 264 psi (1.8 MPa) ° C. | 196 | 196 | 196 | 195 | 194 | 195 |
| % Haze | 4.4 | 5.8 | 6.2 | 6.1 | 7.4 | 7.3 |
| % Transmission | 63 | 63 | 64 | 65 | 62 | 63 |
| Melt Flow Rate at 337° C., 6.7 kg, g/10 min | 9.8 | 10.9 | 9.1 | 9.3 | 8.9 | 9.7 |

The results indicate that the compositions have useful properties. Example 8 showed the addition of 0.2 weight percent of an alkyl carboxylic amide, erucamide, which acts to modify surface properties such as mold release. Note the high % T and low % H, high tensile modulus and high multiaxial impact energy of Example 7, with no euracamide, was retained in Example 8 with the euracamide. Similarly Examples 10 and 12 with 0.2 weight percent of an alkyl fatty acid, stearic acid, which also acted to modify surface properties such as mold release, demonstrated good retention of properties observed in PPSU-PEI blends Examples 9 and 11 with no stearic acid.

Comparative Example H and Example 13

The purpose of Comparative Example H and Example 13 was to evaluate the performance of a blend containing PEI and a PPSU-PSU copolymer. The copolymer had 20 mole % BPA and 80 mole % biphenol polymer made by reaction with dichloro diphenyl sulfone. Results are shown in Table 6.

TABLE 6

|  | H | 13 |
|---|---|---|
| PPSU - PSU 80:20 copolymer | 100 | 40 |
| PEI | 0 | 60 |
| Tensile Strength at Yield in Kpsi (MPa) | 11.0 (76) | 14.4 (99) |
| Tensile Modulus in Kpsi (MPa) | 319 (2199) | 459 (3165) |
| Tensile Elongation at Break in % | 108 | 53 |
| Multiaxial Impact Energy at 73° F. (23° C.) in ft-lbs (J) | 54.0 (73) | 62.7 (85) |
| HDT 264 psi (1.8 MPa) ° C. | 193 | 194 |
| % Haze | 5.1 | 3.3 |
| % Transmission | 57 | 56 |
| Melt Flow Rate at 337° C., 6.7 kgf, g/10 min | 12.4 | 9.2 |

Figure 4:
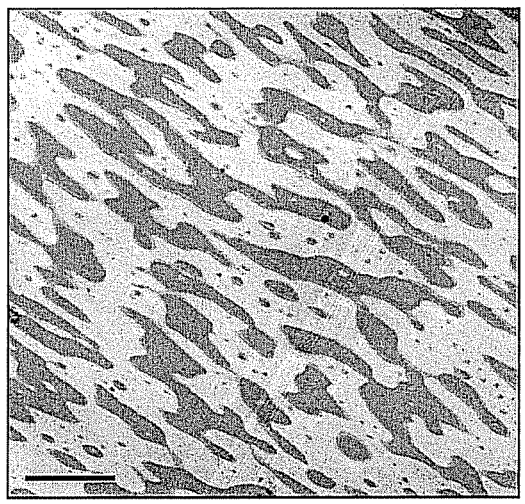

Our results show that the copolymer blends (13) had high multiaxial impact energy, and tensile modulus, good elongation, and high transparency with low haze. The PEI-PPSU-PSU copolymer blend (13) performance was similar to the performance of the PPSU homopolymer-PEI blend (11). The PPSU-PSU copolymer blend with PEI extruded well with no die swell or surging despite the presence of BPA-aryl sulfone linkages in the copolymer. Electron microscopy showed the blend (13) to be phase separated (FIG. 4) with a very fine phase structure (less than about 5 micrometers).

Autoclaving

Autoclave testing was done on injection molded PPSU-PSU copolymer PEI blend (13) parts at 134° C. using steam with 50 ppm morpholine. Samples were tested after 250, 500 and 1000 cycles. For each cycle steam exposure time was 20 minutes. Results are shown in Table 7.

TABLE 7

| Autoclave Testing: Multiaxial Impact Energy in ft-lbs (J) | | | | |
|---|---|---|---|---|
| | Cycles | | | |
| | 0 | 250 | 500 | 1000 |
| | Hours in Autoclave | | | |
| | 0 hours | 83.3 hours | 166.7 hours | 333.3 hours |
| H | 54.0 (73) | 52.8 (72) | 51.3 (69) | 54.6 (74) |
| EX 13 | 62.7 (85) | 49.9 (68) | 48.4 (66) | 38.7 (52) |

Our results show that our compositions exhibited good retention of multiaxial impact energy for the PEI-PPSU-PSU copolymer blend used in Example 13.

Comparative Example I and Examples 14-15

The purpose of Comparative Example I and EXAMPLES 14-15 was to evaluate the performance of blends containing PPSU and polyetherimide sulfone. Results are shown in Table 8.

TABLE 8

|  | I | 14 | 15 |
|---|---|---|---|
| PEIS | 100 | 90 | 50 |
| PPSU | 0 | 10 | 50 |
| Tensile Strength at Yield n Kpsi (MPa) | 13.5 (93) | 13.2 (91) | 12.5 (86) |
| Tensile Modulus in Kpsi (MPa) | 524 (3613) | 512 (3530) | 466 (3213) |
| Tensile Elongation at Break in % | 4 | 4 | 21 |
| Multiaxial Impact Energy |  |  |  |
| at 73° F. (23° C.) in ft-lbs (J) | 10.0 (13) | 21.9 (30) | 50.8 (69) |
| At 32° F. (0° C.) in ft-lbs (J) | 9.4 (13) | 17.6 (24) | 50.1 (68) |
| HDT 264 psi (1.8 MPa)in ° C. | 218 | 217 | 210 |
| % Haze | 6.6 | 6.4 | 9.2 |
| % Transmission | 35 | 41 | 48 |
| Melt Flow Rate at 337° C., 6.7 kg, g/10 min | 4.5 | 5.8 | 8.2 |
| Melt Flow Rate at 367° C., 6.7 kg, g/10 min | 21.8 | 24.6 | 27.7 |

As with PEI, the PEIS-PPSU blend shows high tensile modulus versus PPSU and improved multiaxial impact energy over the PEIS. Multiaxial impact energy is retained at low temperature. Note the higher HDT than in the PEI-PPSU blends. These PEIS-PPSU (examples 14 and 15) blends also extruded well with no surging or die swell.

While the invention has been described with reference to a several embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

The invention claimed is:

1. A composition comprising a phase separated blend comprising:
    50 to 80 weight percent of a polyetherimide; and
    20 to 50 weight percent of a polyphenylene ether sulfone;
    wherein the phase separated blend comprises a dispersed phase having an average cross-section of 0.01 to 10 micrometers;
    wherein the composition initially has a multiaxial impact energy of greater than or equal to 45 ft-lbs (61 Joules) and after 300 hours steam autoclave exposure at 130 to 138° C. has a multiaxial impact energy of greater than or equal to 20 ft-lbs (27 Joules), wherein multiaxial impact energy is determined according to ASTM D3763 at 23° C.;
    wherein the composition has a tensile modulus of greater than or equal to 425,000 psi (2930 MPa) as determined according to ASTM D638;
    wherein the composition has a heat distortion temperature at 264 psi (1.8 MPa) of greater than or equal to 150° C. as determined according to ASTM D648 on a 3.2 millimeter thick sample; and
    wherein weight percent is based on the combined weight of polyetherimide and polyphenylene ether sulfone.

2. The composition of claim 1 wherein the composition has a melt volume rate, as determined according to ASTM D1238, of 1.0 to 25.0 cm$^3$/10minutes at 337° C.

3. The composition of claim 1, wherein the polyetherimide and the polyphenylene ether sulfone each have a weight average molecular weight (Mw) of 20,000 to 70,000 grams/mole and wherein the difference in molecular weight between the two polymers is less than 20% of the higher of the molecular weights.

4. The composition of claim 1, wherein the polyetherimide and the polyphenylene ether sulfone each have a refractive index of 1.620 to 1.670 as determined according to ASTM D542.

5. The composition of claim 1, wherein the composition has a percent transmission at 3.2 millimeters, as determined according to ASTM D1003, of greater than or equal to 50%.

6. The composition of claim 1, wherein the composition further comprises 0.01 to 5.0 weight percent, based on the total weight of the composition, of a mold release agent selected from the group consisting of $C_{15}$ to $C_{30}$ carboxylic acids, $C_{15}$ to $C_{30}$ aliphatic carboxylic amides, and combinations thereof.

7. The composition of claim 1, wherein the polyphenylene ether sulfone has greater than or equal to 50 mole % of its main chain sulfone linkages derived from biphenol.

8. The composition of claim 1, wherein the polyetherimide has a glass transition temperature of 200 to 280° C. and the polyphenylene ether sulfone has a glass transition temperature of 200 to 250° C.

9. The composition of claim 1, wherein the polyetherimide is a polyetherimide sulfone.

10. The composition of claim 1, wherein the composition further comprises from 1 to 30 weight percent, based on the total weight of the composition, of a polymer selected from the group consisting of silicone polyetherimides different from the polyetherimide of claim 1, polyamides, polyphenylene ethers different from the polyphenylene ether sulfone of claim 1, polyolefins, polysulfones different from the polyphenylene ether sulfone of claim 1, polyethersulfones different from the polyphenylene ether sulfone of claim 1, and combinations thereof.

11. The composition of claim 1, wherein the composition has a residual volatile species concentration of less than 300 ppm.

12. The composition of claim 11, wherein the polyphenylene ether sulfone is a copolymer.

13. The composition of claim 1, wherein the composition further comprises a phosphorus containing stabilizer having a molecular weight of greater than or equal to 500 grams/mole.

14. The composition of claim 1, wherein the polyetherimide and the polyphenylene ether sulfone have less than 1 mole % benzylic protons.

15. The composition of claim 1, wherein the polyphenylene ether sulfone comprises repeating units having the formula:

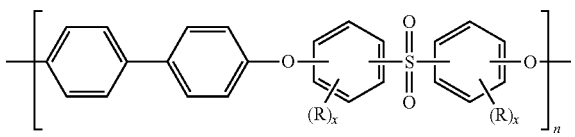

wherein n equals 25 to 1000, R is hydrogen, alkyl, aryl, alkyl aryl, alkoxy, halogen or a combination thereof, and x equals 0 to 4; and wherein the aryl sulfone linkages are selected from the group consisting of 4,4' linkages, 3,3' linkages, 3,4' linkages, and combinations thereof.

16. The composition of claim 1, wherein the polyphenylene ether sulfone is a copolymer of the following structure:

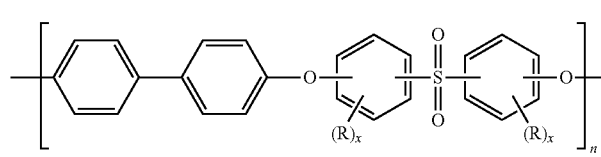 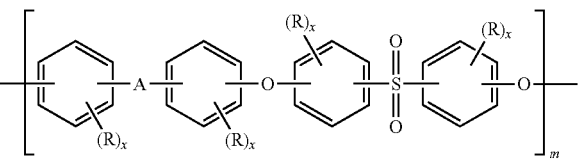

wherein n>m, n+m equals 25 to 1000, R is hydrogen, alkyl, aryl, alkyl aryl, alkoxy, halogen, or a combination thereof, x equals 0 to 4, the aryl sulfone linkages are selected from the group consisting of 4,4' linkages, 3,3' linkages, 3,4' linkages, and combinations thereof, A is selected from the group consisting of: $-O-$, $-S-$, $-SO_2-$, $C_6$-$C_{18}$ aryl, $C_3$-$C_{12}$ alkyl, and combinations thereof, and linkages of A to the aryl groups are selected from the group consisting of 4,4' linkages, 3,3'- linkages, 3,4' linkages, and combinations thereof.

17. The composition of claim 1, wherein the polyphenylene ether sulfone is a homopolymer.

18. The composition of claim 1, wherein the composition has a residual volatile species concentration of less than 1000 ppm.

19. The composition of claim 1, wherein the polyphenylene ether sulfone is a homopolymer.

20. The composition of claim 1, wherein the polyphenylene ether sulfone is a copolymer.

21. An article derived from a composition comprising a phase separated blend comprising:
50 to 80 weight percent of a polyetherimide; and
20 to 50 weight percent of a polyphenylene ether sulfone;
wherein the phase separated blend comprises a dispersed phase having an average cross-section of 0.01 to 10 micrometers;
wherein the composition initially has a multiaxial impact energy of greater than or equals to 45 ft-lbs (61 J) and after 300 hours steam autoclave exposure at 130 to 138° C. has a multiaxial impact energy of greater than or equal to 20 ft-lbs (27 J), wherein multiaxial impact energy is determined according to ASTM D3763 at 23° C.;
wherein the composition has a tensile modulus of greater than or equal to 425,000 psi (2930 MPa) as determined according to ASTM D638;
wherein the composition has a heat distortion temperature at 264 psi (1.8 MPa) of greater than or equal to 150° C. as determined according to ASTM D648 on a 3.2 millimeter thick molded sample;
wherein weight percent is based on the combined weight of polyetherimide and polyphenylene ether sulfone;
wherein the composition has a heat distortion temperature (HDT) at 264 psi (1.8 MPa) of greater than or equal to 175° C., and
wherein the polyetherimide and the polyphenylene ether sulfone each have a weight average molecular weight (Mw) of 20,000 to 70,000 grams/mole and wherein the difference in molecular weight between the two polymers is less than 20% of the higher of the molecular weights.

22. The article of claim 21, wherein the polyetherimide has a glass transition temperature of 200 to 280° C. and the polyphenylene ether sulfone has a glass transition temperature of 200 to 250° C.

23. The article of claim 21, wherein the polyetherimide is a polyetherimide sulfone.

24. The article of claim 21, wherein the polyphenylene ether sulfone is a homopolymer.

25. The article of claim 21, wherein the polyphenylene ether sulfone is a copolymer.

26. The article of claim 21, wherein the polyphenylene ether sulfone has greater than or equal to 50 mole % of its main chain sulfone linkages derived from biphenol.

27. The article of claim 21, wherein the polyphenylene ether sulfone comprises repeating units having the formula:

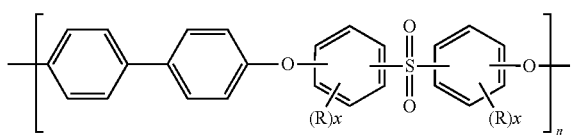

wherein n equals 25 to 1000, R is hydrogen, alkyl, aryl, alkyl aryl, alkoxy, halogen or a combination thereof, and x equals 0 to 4; and wherein the aryl sulfone linkages are selected from the group consisting of 4,4' linkages, 3,3' linkages, 3,4' linkages, and combinations thereof.

28. The article of claim 21, wherein the polyphenylene ether sulfone is a copolymer of the following structure:

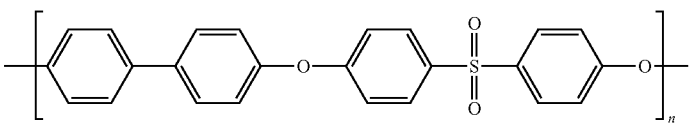

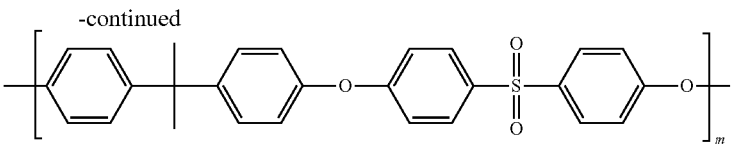

wherein n>m, n+m equals 25 to 1000.

29. The article of claim 21, wherein the composition further comprises 0.01 to 5.0 weight percent, based on the total weight of the composition, of a mold release agent selected from the group consisting of $C_{15}$ to $C_{30}$ carboxylic acids, $C_{15}$ to $C_{30}$ aliphatic carboxylic amides, and combinations thereof.

30. A composition comprising a phase separated blend comprising:
    60 to 80 weight percent of a polyetherimide; and
    20 to 40 weight percent of a polyphenylene ether sulfone;
    wherein the phase separated blend comprises a dispersed phase having an average cross-section of 0.01 to 10 micrometers;
    wherein the composition initially has a multiaxial impact energy of greater than or equal to 45 ft-lbs (61 J) and after 300 hours steam autoclave exposure at 130 to 138° C. has a multiaxial impact energy of greater than or equal to 20 ft-lbs (27 J) wherein multiaxial impact energy is determined according to ASTM D3763 at 23° C.;
    wherein the composition has a tensile modulus of greater than or equal to 425,000 psi (2930 MPa) as determined according to ASTM D638;

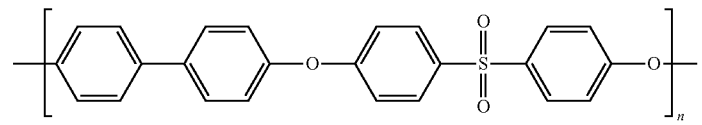

wherein the composition has a heat distortion temperature at 264 psi (1.8 MPa) of greater than or equal to 175° C. as determined according to ASTM D648 on a 3.2 millimeter molded thick sample;
    wherein weight percent is based on the combined weight of polyetherimide and polyphenylene ether sulfone.

31. The composition of claim 30, wherein the composition has a residual volatile species concentration of less than 300 ppm.

32. The composition of claim 30, wherein the polyetherimide and the polyphenylene ether sulfone each have a weight average molecular weight (Mw) of 20,000 to 70,000 grams/mole and wherein the difference in molecular weight between the two polymers is less than 20% of the higher of the molecular weights and wherein the polyetherimide has a glass transition temperature of 200 to 280° C. and the polyphenylene ether sulfone has a glass transition temperature of 200 to 250° C.

33. The composition of claim 30, wherein the polyetherimide is a polyetherimide sulfone.

34. The composition of claim 30, wherein the polyphenylene ether sulfone is a copolymer.

35. The composition of claim 30, wherein the polyphenylene ether sulfone has greater than or equal to 50 mole % of its main chain sulfone linkages derived from biphenol.

36. The composition of claim 30, wherein the polyphenylene ether sulfone comprises repeating units having the formula:

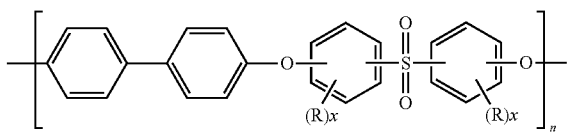

wherein n equals 25 to 1000, R is hydrogen, alkyl, aryl, alkyl aryl, alkoxy, halogen or a combination thereof, and x equals 0 to 4; and wherein the aryl sulfone linkages are selected from the group consisting of 4,4' linkages, 3,3' linkages, 3,4' linkages, and combinations thereof.

37. The composition of claim 30, wherein the polyphenylene ether sulfone is a copolymer of the following structure:

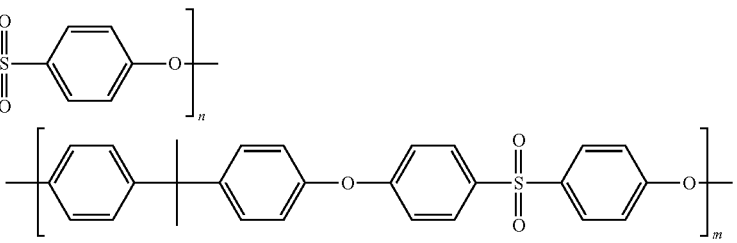

wherein n>m, n+m equals 25 to 1000.

38. The composition of claim 30, wherein the composition further comprises 0.01 to 5.0 weight percent, based on the total weight of the composition, of a mold release agent selected from the group consisting of $C_{15}$ to $C_{30}$ carboxylic acids, $C_{15}$ to $C_{30}$ aliphatic carboxylic amides, and combinations thereof; and the composition further comprises a phosphorus containing stabilizer having a molecular weight of greater than or equal to 500 grams/mole.

39. A composition comprising a phase separated blend comprising:
    60 to 80 weight percent of a polyetherimide; and
    20 to 40 weight percent of a polyphenylene ether sulfone:
    wherein the phase separated blend comprises a dispersed phase having an average cross-section of 0.01 to 10 micrometers;
    wherein the composition initially has a multiaxial impact energy of greater than or equal to 45 ft-lbs (61 J) and after 300 hours steam autoclave exposure at 130 to 138° C. has a multiaxial impact energy of greater than or equal to 20 ft-lbs (27 J), wherein multiaxial impact energy is determined according to ASTM D3763 at 23° C.;
    wherein the composition has a tensile modulus of greater than or equal to 425,000 psi (2930 MPa) as determined according to ASTM D638;

wherein the composition has a heat distortion temperature at 264 psi (1.8 MPa) of greater than or equal to 175° C. as determined according to ASTM D648 on a 3.2 millimeter thick sample;

and a percent transmission at 3.2 millimeters of greater than or equal to 50% as determined according to ASTM method D1003, wherein weight percent is based on the combined weight of polyetherimide and polyphenylene ether sulfone.

40. The composition of claim 39, wherein the composition has a residual volatile species concentration of less than 300 ppm.

41. The composition of claim 39, wherein the polyetherimide and the polyphenylene ether sulfone each have a refractive index of 1.620 to 1.670 as determined according to ASTM D542.

42. The composition of claim 39, wherein the polyetherimide and the polyphenylene ether sulfone each have a weight average molecular weight (Mw) of 20,000 to 70,000 grams/mole and wherein the difference in molecular weight between the two polymers is less than 20% of the higher of the molecular weights; and wherein the polyetherimide has a glass transition temperature of 200 to 280° C. and the polyphenylene ether sulfone has a glass transition temperature of 200 to 250° C.

43. The composition of claim 39, wherein the polyetherimide is a polyetherimide sulfone.

44. The composition of claim 39, wherein the polyphenylene ether sulfone is a homopolymer.

45. The composition of claim 39, wherein the polyphenylene ether sulfone has greater than or equal to 50 mole % of its main chain sulfone linkages derived from biphenol.

46. The composition of claim 39, wherein the polyphenylene ether sulfone comprises repeating units having the formula:

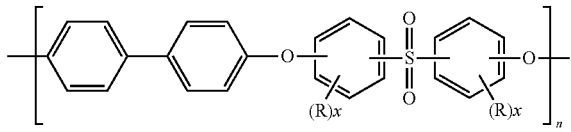

wherein n equals 25 to 1000, R is hydrogen, alkyl, aryl, alkyl aryl, alkoxy, halogen or a combination thereof, and x equals 0 to 4; and wherein the aryl sulfone linkages are selected from the group consisting of 4,4' linkages, 3,3' linkages, 3,4' linkages, and combinations thereof.

47. The composition of claim 39, wherein the polyphenylene ether sulfone is a copolymer of the following structure:

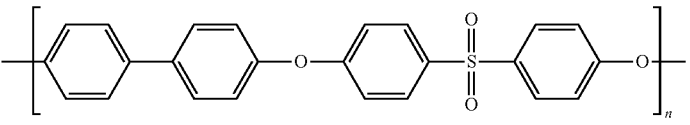
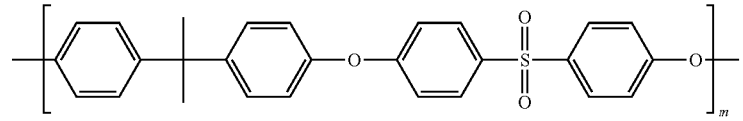

wherein n>m, n+m equals 25 to 1000.

48. The composition of claim 39, wherein the composition further comprises 0.01 to 5.0 weight percent, based on the total weight of the composition, of a mold release agent selected from the group consisting of $C_{15}$ to $C_{30}$ carboxylic acids, $C_{15}$ to $C_{30}$ aliphatic carboxylic amides, and combinations thereof; and the composition further comprises a phosphorus containing stabilizer having a molecular weight of greater than or equal to 500 grams/mole.

49. A composition comprising a phase separated blend comprising:
  60 to 80 weight percent of a polyetherimide; and
  20 to 40 weight percent of a polyphenylene ether sulfone of the comprising repeating units of formula;

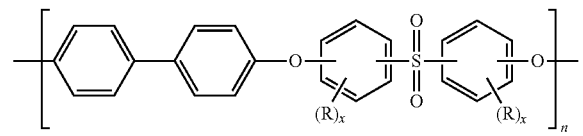

wherein n equals 25 to 1000, R is hydrogen, alkyl, aryl, alkyl aryl, alkoxy, halogen or combination thereof, and x equals 0 to 4; and wherein the aryl sulfone linkages are selected from the group consisting of 4,4' linkages, 3,3' linkages, 3,4' linkages, and combinations thereof, wherein the phase separated blend comprises a dispersed phase having an average cross-section of 0.01 to 10 micrometers;

wherein the polyetherimide and the polyphenylene ether sulfone each have a weight average molecular weight (Mw) from 20,000 to 70,000 grams/mole and wherein the difference in molecular weight between the two polymers is less than 20% of the higher of the molecular weights;

wherein the composition initially has a multiaxial impact energy of greater than or equal to 45 ft-lbs (61 J) and after 300 hours steam autoclave exposure at 130 to 135° C. has a multiaxial impact energy of greater than or equal to 20 ft-lbs (27 J), wherein multiaxial impact energy is determined according to ASTM D3763 at 23° C.;

wherein the composition has a tensile modulus of greater than or equal to 425,000 psi (2930 MPa) as determined according to ASTM D638;

wherein the composition has a heat distortion temperature at 264 psi (1.8 MPa) of greater than or equal to 175° C. as determined according to ASTM D648 on a 3.2 millimeter thick sample;

wherein weight percent is based on the combined weight of polyetherimide and polyphenylene ether sulfone.

50. The composition of claim 49 wherein the composition has a melt volume rate, as determined according to ASTM D1238, of 1.0 to 25.0 cm³/10 minutes at 337° C.

51. The composition of claim 49, wherein the composition has a percent transmission of greater than or equal to 50% as determined according to ASTM D1003 on a 3.2 millimeter thick sample.

52. The composition of claim 49, wherein the composition has a residual volatile species concentration of less than 300 ppm.

53. The composition of claim 49, wherein the polyetherimide and the polyphenylene ether sulfone each have a refractive index of 1.620 to 1.670 as determined according to ASTM D542.

54. The composition of claim 49, wherein the polyetherimide has a glass transition temperature of 200 to 280° C. and the polyphenylene ether sulfone has a glass transition temperature of 200 to 250° C.

55. The composition of claim 49, wherein the polyetherimide is a polyetherimide sulfone.

56. The composition of claim 49, wherein the polyphenylene ether sulfone is a homopolymer.

57. The composition of claim 49, wherein the polyphenylene ether sulfone is a copolymer.

58. The composition of claim 49, wherein the polyphenylene ether sulfone has greater than or equal to 50 mole % of its main chain sulfone linkages derived from biphenol.

59. The composition of claim 49, wherein the polyphenylene ether sulfone is a copolymer of the following structure:

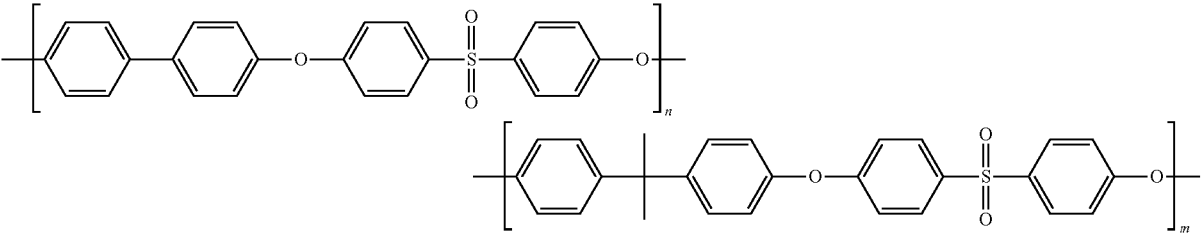

wherein n>m, n+m equals 25 to 1000.

60. The composition of claim 49, wherein the composition further comprises 0.01 to 5.0 weight percent, based on the total weight of the composition, of a mold release agent selected from the group consisting of $C_{15}$ to $C_{30}$ carboxylic acids, $C_{15}$ to $C_{30}$ aliphatic carboxylic amides, and combinations thereof; and the composition further comprises a phosphorus containing stabilizer having a molecular weight of greater than or equal to 500 grams/mole.

61. The composition of claim 49, wherein the composition further comprises from 1 to 30 weight percent, based on the total weight of the composition, of a polymer selected from the group consisting of silicone polyetherimides different from the polyetherimide of claim 49, polyamides, polyphenylene ethers different from the polyphenylene ether sulfone of claim 49, polyolefins, polysulfones different from the polyphenylene ether sulfone of claim 49, polyethersulfones different from the polyphenylene ether sulfone of claim 49, and combinations thereof.

62. A composition comprising a phase separated blend comprising:
60 to 80 weight percent of a polyetherimide; and
20 to 40 weight percent of a polyphenylene ether sulfone comprising repeating units of the following formula;

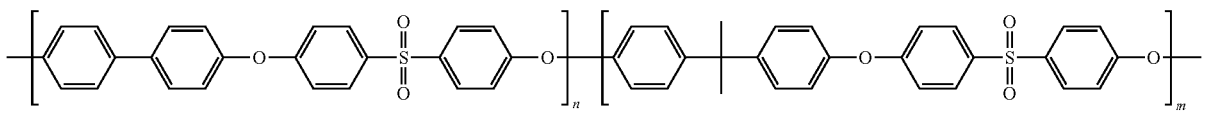

wherein n>m and n+m equals 25 to 100, wherein the phase separated blend comprises a phase having an average cross-section of 0.01 to 10 micrometers;

wherein the composition initially has a multiaxial impact energy of greater than or equal to 45 ft-lbs (61 J) and after 300 hours steam autoclave exposure at 130 to 138° C. has a multiaxial impact energy of greater than or equal to 20 ft-lbs (27 J), wherein multiaxial impact energy is determined according to ASTM D3763 at 23° C.;

wherein the composition has a tensile modulus of greater than or equal to 425,000 psi (2930 MPa) as determined according to ASTM D638;

wherein the composition has a heat distortion temperature at 264 psi (1.8 MPa) of greater than or equal to 175° C. as determined according to ASTM D648 on a 3.2 millimeter molded thick sample;

wherein weight percent is based on the combined weight of polyetherimide and polyphenylene ether sulfone.

63. The composition of claim 62 wherein the composition has a melt volume rate of 1.0 to 25.0 cm$^3$/10 minutes at 337° C. as determined according to ASTM D1238.

64. The composition of claim 62, wherein the composition has a percent transmission of greater than or equal to 50% as determined according to ASTM D1003 on a 3.2 millimeter thick sample.

65. The composition of claim 62, wherein the composition has a residual volatile species concentration of less than 300 ppm.

66. The composition of claim 62, wherein the polyetherimide and the polyphenylene ether sulfone each have a refractive index of 1.620 to 1.670 as determined according to ASTM D542.

67. The composition of claim 62, wherein the polyetherimide and the polyphenylene ether sulfone each have a weight average molecular weight (Mw) of 20,000 to 70,000 grams/mole and wherein the difference in molecular weight between the two polymers is less than 20% of the higher of the molecular weights; and wherein the polyetherimide has a glass transition temperature of 200 to 280° C. and the polyphenylene ether sulfone has a glass transition temperature of 200 to 250° C.

68. The composition of claim 62, wherein the polyetherimide is a polyetherimide sulfone.

69. The composition of claim 62, wherein the polyphenylene ether sulfone has greater than or equal to 50 mole % of its main chain sulfone linkages derived from biphenol.

70. The composition of claim 62, wherein the composition further comprises 0.01 to 5.0 weight percent, based on the total weight of the composition, of a mold release agent selected from the group consisting of $C_{15}$ to $C_{30}$ carboxylic acids, $C_{15}$ to $C_{30}$ aliphatic carboxylic amides, and combinations thereof; and the composition further comprises a phosphorus containing stabilizer having a molecular weight of greater than or equal to 500 grams/mole.

71. The composition of claim 62, wherein the composition further comprises from 1 to 30 weight percent, based on the total weight of the composition, of a polymer selected from the group consisting of silicone polyetherimides different from the polyetherimide of claim 62, polyamides, polyphenylene ethers different from the polyphenylene ether sulfone of claim 62, polyolefins, polysulfones different from the polyphenylene ether sulfone of claim 62, polyethersulfones different from the polyphenylene ether sulfone of claim 62, and combinations thereof.

* * * * *